A. J. GIBSON.
Churn Dasher.
No. 55,484.
Patented June 12, 1866.
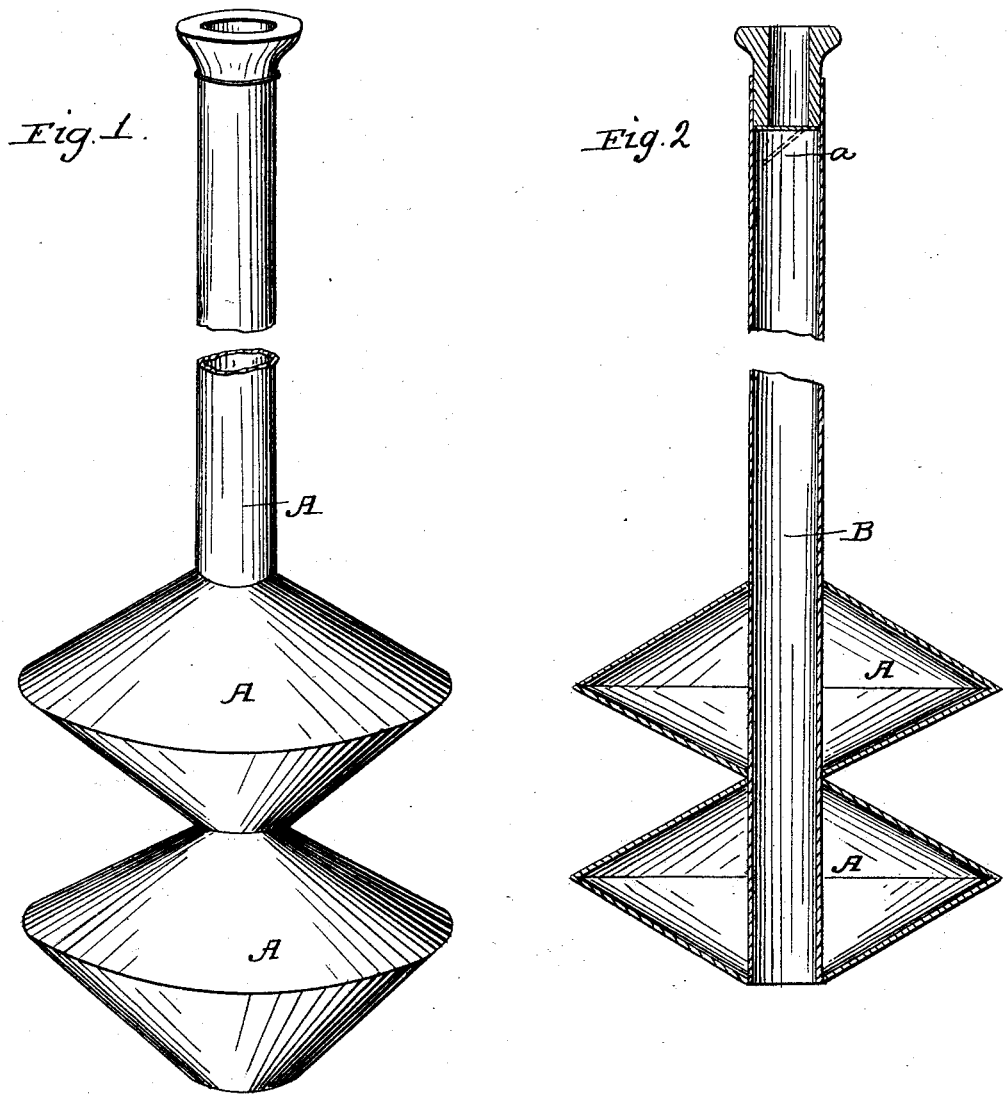

UNITED STATES PATENT OFFICE.

A. J. GIBSON, OF CINCINNATI, OHIO.

IMPROVEMENT IN CHURN-DASHERS.

Specification forming part of Letters Patent No. 55,484, dated June 12, 1866.

*To all whom it may concern:*

Be it known that I, A. J. GIBSON, of Cincinnati, Hamilton county, and State of Ohio, have invented a new and useful Improvement in Atmospheric Churn-Dashes; of which the following is a full and clear description, reference being had to the accompanying drawings, making part of this specification.

My invention relates to an open churn-dash having surfaces making with each other such angles as will most effectually destroy the sacks containing globules of butter when the milk is brought in contact with them, and at the same time cause a more thorough permeation of fresh air through the milk, the operation of churning causing the air to pass down the tubular churn-handle into the open churn-dash.

Figure 1 is a perspective view of the exterior of my improved churn-dash. Fig. 2 is a longitudinal section through my improved dash and churn-handle.

A is my improved churn-dash, attached to the atmospheric churn-handle B. It is usually made of light metal without perforations. In form it presents the appearance of two truncated cones joined base to base. The churn-handle B passes through the dash A, having a valve, *a*, near its free end.

When the dash is pressed down into the milk it causes it to rise into the barrel of the churn and over the dash. The upward movement of the dash causes the air in the churn-handle B to permeate the milk. This aerated milk is deflected from one conical surface to another, thus gradually and surely, by means of friction and easy pressure, reducing the sacks containing the globules of butter, until finally the butter is prepared for gathering, which is done with facility by elevating and depressing slowly the dash through the milk. Each conical surface acts as an independent dash.

Having fully described my improved atmospheric churn-dash, its use and advantages, I make the following claims:

1. The churn-dash A, constructed with two truncated cones placed base to base, one or more of which may be united, forming a more extended dash, as shown in the drawings, as above described and set forth.

2. The churn-dash A, in combination with the churn-handle B, for the purpose above specified.

A. J. GIBSON.

Attest:
CHARLES L. FISHER,
WILLIAM R. McCOMAS.